United States Patent [19]

Nakagiri

[11] Patent Number: 4,477,797
[45] Date of Patent: Oct. 16, 1984

[54] DATA INPUT DEVICE FOR ELECTRONIC DEVICE

[75] Inventor: Tadahiko Nakagiri, Tokorozawa, Japan

[73] Assignee: Citizen Watch Company Limited, Tokyo, Japan

[21] Appl. No.: 328,986

[22] Filed: Dec. 9, 1981

[30] Foreign Application Priority Data

| Dec. 12, 1980 | [JP] | Japan | 55-175614 |
| Dec. 12, 1980 | [JP] | Japan | 55-175615 |
| Dec. 12, 1980 | [JP] | Japan | 55-175621 |
| Dec. 26, 1980 | [JP] | Japan | 55-184079 |
| Dec. 26, 1980 | [JP] | Japan | 55-184080 |
| Dec. 26, 1980 | [JP] | Japan | 55-184081 |
| Dec. 26, 1980 | [JP] | Japan | 55-184082 |
| Jan. 13, 1981 | [JP] | Japan | 56-3496 |

[51] Int. Cl.³ .............................................. G08C 9/00
[52] U.S. Cl. ........................... 340/365 S; 340/712; 368/10; 382/13; 382/59
[58] Field of Search ............... 340/365 S, 712; 382/13, 382/59; 368/10

[56] References Cited

U.S. PATENT DOCUMENTS

| 4,005,400 | 1/1977 | Engdahl | 382/59 X |
| 4,047,010 | 9/1977 | Perotto et al. | 382/13 X |
| 4,139,837 | 2/1979 | Liljenwall et al. | 382/13 |
| 4,199,751 | 4/1980 | Piguet | 340/365 S |
| 4,284,975 | 8/1981 | Odaka | 382/13 |

Primary Examiner—David L. Trafton
Attorney, Agent, or Firm—Jordan and Hamburg

[57] ABSTRACT

A data input device for inputting data in the form of patterns to an electronic device such as an electronic timepiece is disclosed. Data input is performed by tracing out patterns, each representing a character, numeral or symbol, such as to successively actuate a plurality of sensor elements, which can comprise touch-sensitive electrodes arrayed over a display device, and pattern recognition is performed by interpreting pairs of successive sensor element actuations as lines of an input pattern, rather than separately interpreting individual sensor element actuations as point inputs.

5 Claims, 40 Drawing Figures

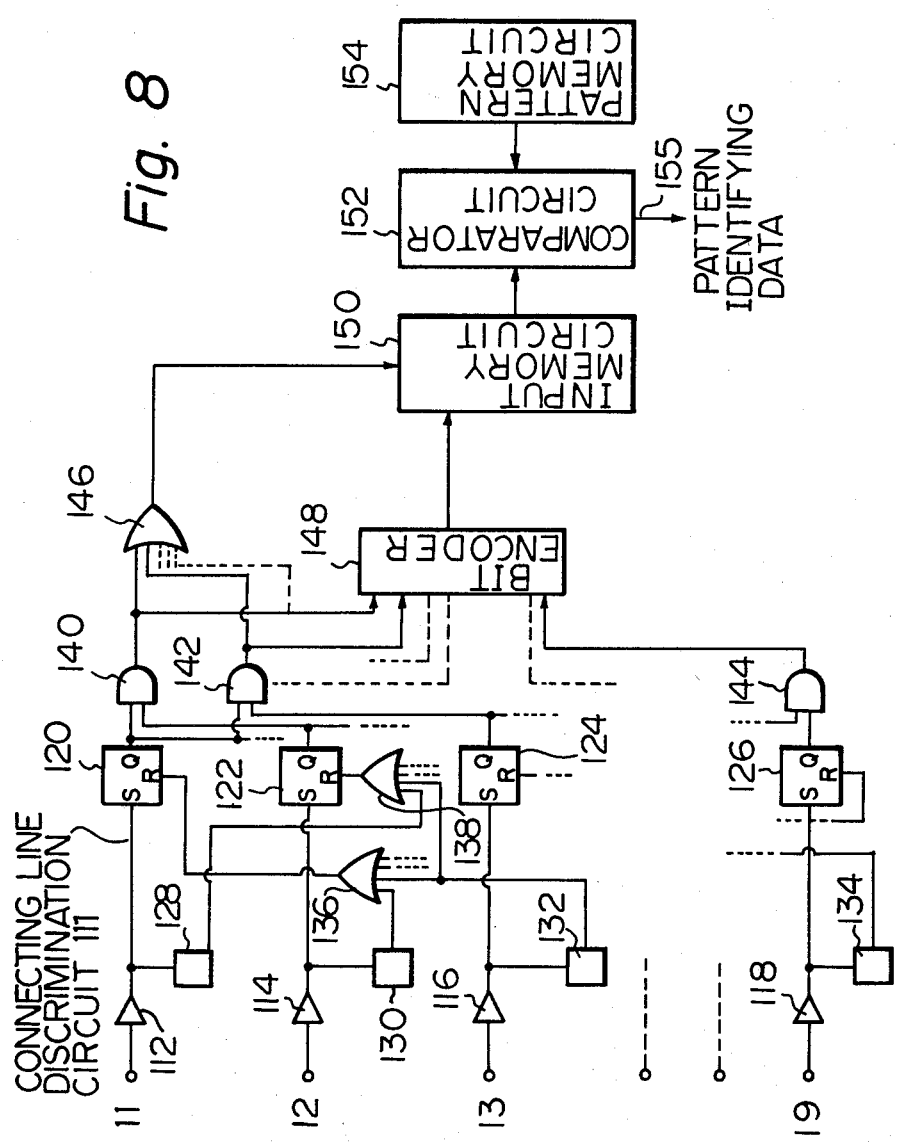

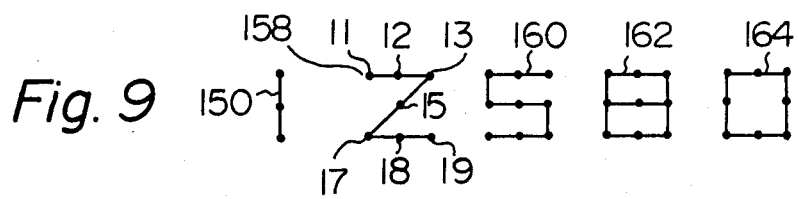
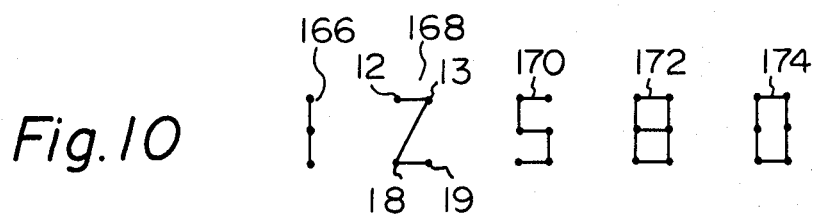
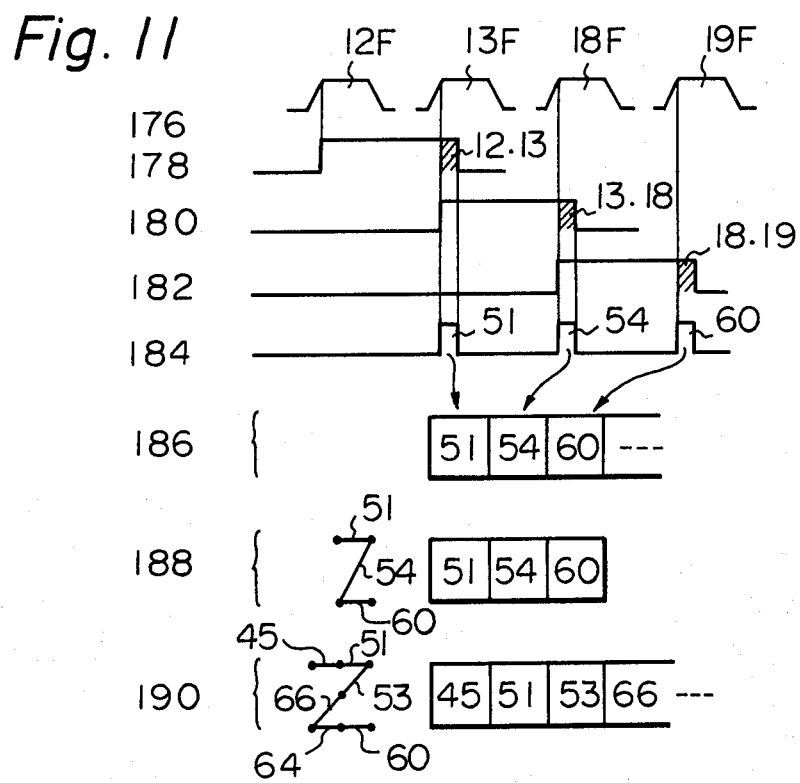

Fig. 18

ABCDEFGH
IJKLMNOP
QRSTUVWX
YZ1234567890

Fig. 24
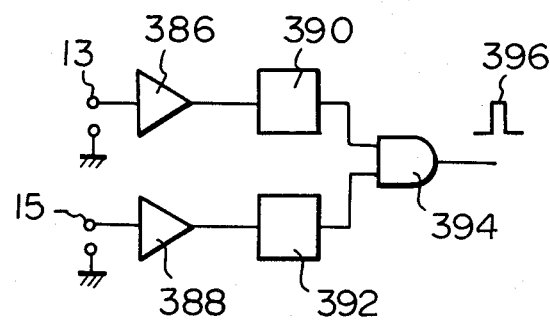
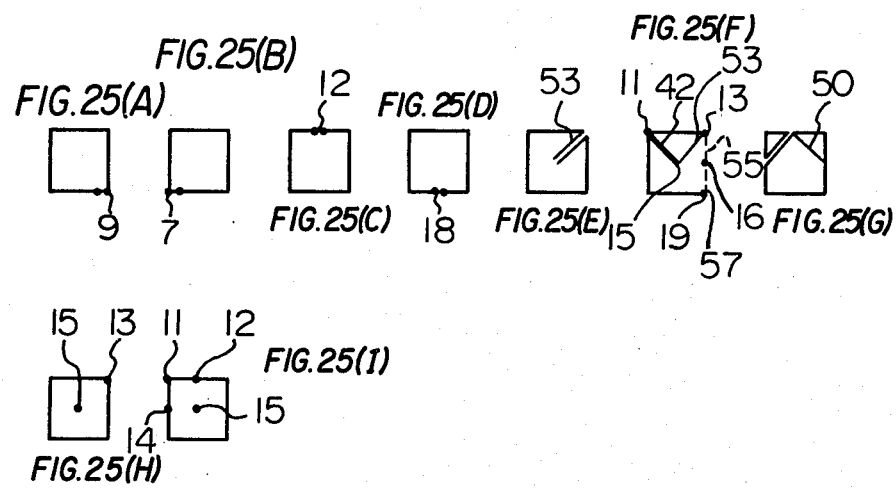

DATA INPUT DEVICE FOR ELECTRONIC DEVICE

BACKGROUND OF THE INVENTION

In recent years, various types of miniature portable electronic devices such as electronic watches, electronic calculators, etc, have come into widespread use. In the case of electronic calculators, the normal arrangement used for input of data such as numerals and symbols is to provide a conventional type of keyboard made up of an number of pushbutton switches, with each switch being used to input a particular numeral, character or symbol. Such an arrangement is convenient for use with a device which is reasonable large in size. However, in the case of a device which is of very small size, such as an electronic wristwatch, the size of the keys and the keyboard must be made extremely small, making the input of data to such a device highly inconvenient. There is therefore a requirement at present for some means of inputting data to a miniature electronic device such as an electronic wristwatch which will not require the use of a keyboard and pushbutton switches, and which will be easy and convenient to use. With the availability of such input means, in conjunction with recent advances in integrated circuit technology, various new facilities could be provided such as, for example, a list of names, telephone numbers, addresses, etc., stored in an electronic wristwatch and easily accessed by the wearer when desired.

The present invention discloses such input means, overcoming the problems of prior art input means such as pushbutton keyboards discussed above. With an input device according to the present invention, a user can input data in the form of patterns representing numerals, characters or symbols, simply by tracing out the shape of each pattern over an array of sensor elements such as touch-sensitive switch electrodes. These sensor elements can conveniently be arrayed over a display surface of the device into which data is input, so that the user can immediately confirm correct input of each pattern, so that for example the sensor elements could be arranged on the upper surface of the watch glass of an electronic wristwatch. It is a particular feature of the present invention that the data input from the sensor elements is interpreted in such a way that only a small number of sensor elements can be used to represent a very large number of different patterns.

SUMMARY OF THE INVENTION

An input device according to the present invention comprises a plurality of sensor elements, each individually actuatable for generating an electrical signal, arrayed in predetermined positions substantially in a common plane, circuit means coupled to receive signals produced by the sensor elements and operative to produce specific data identifying each pair of sensor elements which are actuated in succession, an input memory for storing the data from the latter circuit means so that the contents of the input memory represent each of the connecting lines between pairs of sensor element which are traced out when a pattern is input, a pattern memory whose contents consist of data representing a number of different patterns, each in the form of one or more connecting lines between sensor elements, and a comparator circuit for comparing the contents of the input memory, when input of a pattern has been completed, with the contents of the pattern memory. If the contents of the input memory are detected as corresponding to one of the patterns stored in the pattern memory during this comparison process, then data identifying the input pattern is generated, to be transferred to the device into which the data represented by the patterns has to be read.

It is an important feature of the present invention that inputs from the sensor elements are processed, for the purposes of pattern recognition, as interconnecting lines between pairs of sensors, rather than as point inputs from individual sensors. This feature enables a very large number of different patterns to be input using only a small number of sensor elements. This is because, if there are n sensor elements, then the number of possible different input patterns is $2^n$. Thus, for example, if an array of nine sensor elements is employed, then a total of $2^9$, i.e. 512 different patterns can be input. Thus, as described hereinafter, data comprising alphabetic characters, numerals and various symbols can be readily input using an input device according to the present invention.

It is another feature of an input device according to the present invention that a character or numeral can be input as any of a number of different patterns, resulting from differences in individual handwriting characteristics, yet any of these patterns will be correctly recognized as the desired character or numeral. This is made possible by storing various patterns for each character or numeral corresponding to different shapes in which the character or numeral may be written by different persons.

Another important feature of an input device according to the present invention is that each pattern which is held permanently stored for pattern recognition purposes need not comprise all of the lines by which that pattern will be written into the input device, but only a minimum combination of lines which is unique to that pattern, in relation to all of the other patterns held permanently stored. In other words, although a complete pattern representing the letter C for example, would be written as three consecutive lines, it is possible that this letter would be represented in the permanent pattern memory as only two lines, provided that this particular combination of lines is unique to the letter C. Thus, the memory capacity required for an input device according to the present invention can be significantly smaller than that required with conventional types of character recognition input devices.

It is another feature of an input device according to the present invention that a delimiting signal, to indicate the completion of writing in each pattern, can be generated very simply and conveniently, for example by actuating a predetermined one of sensor elements twice in succession. Thus, input of patterns can be performed more rapidly and easily than in the case of prior art pattern recognition input devices in which it is necessary to wait for a predetermined time interval after writing in each pattern before beginning to write the next pattern, or in which a pushbutton switch must be actuated upon completion of writing each pattern.

A data input device according to the present invention is highly suited to use in an electronic wristwatch. In this case, the sensor elements can comprise electrodes of touch-sensitive switches, arranged on the surface of the watch glass, and input of characters, numerals or symbols can be monitored using the digital display of the watch. To ensure use of most of the watch glass area, most of the sensor elements can be arranged around the periphery of the watch glass, with a single element in the center. To prevent leakage currents from the peripheral sensor elements from causing increased battery power consumption while the data input device is not in use, it can be arranged that the peripheral sensor elements are normally in a nonoperative condition, and that they can be brought into the operative condition by actuating the central sensor element twice or more in succession.

Other features and advantages of an input device according to the present invention can be understood from the following description of the preferred embodiments, given with reference to the attached drawings, the scope of the present invention being made clear from the appended claims.

BRIEF DESCRIPTION OF THE DRAWINGS

FIG. 8 is a general circuit diagram of an embodiment of a data input device according to the present invention comprising a connecting line discrimination circuit, an input memory circuit, a pattern memory circuit and a comparator circuit;

FIG. 9 and FIG. 10 are diagrams for illustrating how alphabetic characters and numerals may be input using a data input device according to the present invention by using separate sets of sensor elements;

FIG. 11 is a diagram for illustrating how the contents of the input memory circuit vary depending upon whether an alphabetic character or a numeral is input, for the arrangement described with reference to FIG. 9 and FIG. 10;

FIG. 18 is a diagram for illustrating how each of the capital alphabetic letters and each of the numerals can be represented by a minimum combination of cconnecting lines which is unique to that letter or numeral;

FIG. 24 is a diagram of a circuit for generating a delimiting signal by simultaneous actuation of two different sensor elements;

FIGS. 24A to 25I are diagrams for illustrating how various different input signals, which are never generated when inputting letters, numerals or symbols, may be utilized to generate command signals;

DESCRIPTION OF THE PREFERRED EMBODIMENTS

Figure 1:
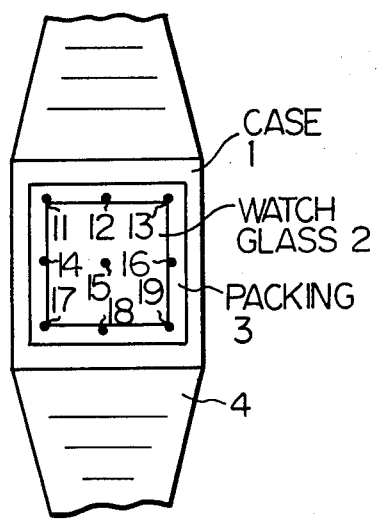
FIG. 1 is a plan view of an embodiment of an electronic wristwatch incorporating a data input device according to the present invention.

Referring now to FIG. 1, a plan view is shown therein of an electronic wristwatch which incorporates an embodiment of a data input device according to the present invention. Numeral 1 denotes the watch case, numeral 2 the watch glass, and numeral 3 a ring of packing material fixed between case 1 and watch glass 2 to prevent entry of dust or moisture. Numerals 11 to 19 denote an array of sensor elements, which in this embodiment comprise touch-sensitive sensor electrodes. The sensor elements are arranged in a regular rectangular array, with 8 sensor elements positioned around the periphery of watch glass 2 adjacent to packing ring 3, and one sensor element 15 positioned at the center of watch glass 2. Numeral 4 denotes the watch band.

With a data input device according to the present invention, patterns representing characters, numerals or symbols are input, one after the other, by manually tracing out the shape of each character over an array of sensor elements such as sensor elements 11 to 19, in such a way as to successively actuate the sensor elements. Each sensor element generates an individual electrical signal in response to such actuation, but with a data input device according to the present invention these individual electrical signals are converted into signals representing successive actuations of sensor element pairs. In other words, sensor elements 11, 12 and 13 might be successively actuated in the course of tracing out a particular input pattern, and signals successively generated by these sensor elements. However the circuitry of the data input device will convert these separate, i.e. "point input" signals into a first signal representing the successive actuatins of sensor elements 11 and 12, i.e. representing the connecting line between sensor elements 11 and 12, and a second signal representing the successive actuations of sensor elements 12 and 13, i.e. representing the connecting line between sensor elements 11 and 13 which is traced out in the course of actuating the latter sensor elements successively. Thus, for example, the input of a pattern representing the letter H would be processed by the data input device as input of the connecting lines between sensor element pairs 11 and 14, 14 and 17, 13 and 16, 16 and 19, 14 and 15, and 15 and 16.

Figure 2:
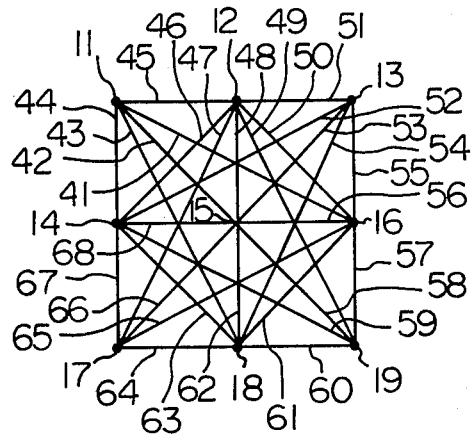
FIG. 2 is a diagram for illustrating all of the possible connecting line inputs which can be produced by an array of sensor elements in the embodiment of FIG. 1.

FIG. 2 is a diagram showing all of the possible connecting lines between pairs of sensor elements which are available with an array of 9 sensor elements such as that of FIG. 1. As shown, a total of 28 of these connecting lines are available, denoted by numerals 41 to 68. As will be described in detail hereinafter, all of the alphabetic letters, all of the numerals from 0 to 9, and a large number of symbols can be represented by various combinations of the connecting lines shown in FIG. 3. When a pattern representing a letter, numeral or symbol is input by tracing out the pattern shape such as to successively actuate some of sensor elements 11 to 19, data representing that character as a combination of connecting lines between sensor elements is generated and stored in an input memory. Upon completion of tracing out that pattern, the latter data is compared with data stored in a pattern memory, representing the alphabetic letters, numerals and symbols. When the combination of connecting lines stored in the input memory is detected as corresponding to one of the combinations of connecting lines stored in the pattern memory, data identifying the input pattern is generated by the data input device.

Figure 3:
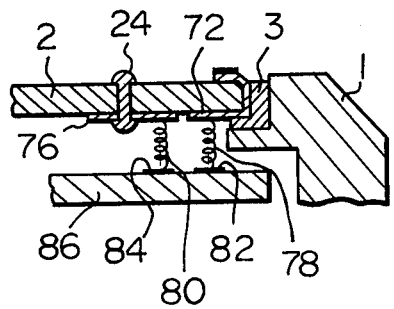
FIG. 3 is a partial cross-sectional view in elevation illustrating an arrangement of sensor elements in the wristwatch embodiment of FIG. 1.

FIG. 3 is a partial cross-sectional view through the watch of FIG. 1, showing an example of touch-sensitive sensor elements used as sensor elements 11 to 19 of FIG. 1. Sensor element 11 (and, similarly, sensor elements 12, 13, 14, 16, 17, 18 and 19) comprises a sensor electrode formed over a conductive layer 72 formed on watch glass 2, with conductive layer 72 being disposed over a portion of the exterior surface of watch glass 2 and extending to the interior surface thereof, passing between watch glass 2 and packing ring 3. A connecting lead 78 is provided between the inner portion of conductive layer 72 and a connecting pad 82 provided on a circuit board 86. Central sensor element 15 in this embodiment comprises a sensor electrode formed of a conductive member 15 which is fixedly attached within an aperture formed in watch glass 2 such as to extend above the inner and outer surfaces thereof. Conductive member 15 is electrically connected through a conductive layer 76 on the inner surface of watch glass 2 and a connecting lead 80 to a connecting pad 84 formed on circuit board 86. Circuit board 86 connecting line discrimination and memory circuits, described hereinafter, for performing identification of data which is input as patterns traced out by consecutively touching sensor elements 11 to 19. Each sensor element in this embodiment is coupled to the input of a high input impedance amplifier, and normally held at a predetermined potential. When a sensor element is touched by the user's finger, the element is changed from the predetermined potential to the potential of case 1, which will be referred to herein as ground potential, and this change in potential constitutes a signal indicating actuation of that sensor.

It should be noted that although in this embodiment touch-sensitive electrodes operating on the principle of electrical conduction through the human body are utilized as sensor elements, it is equally possible to use various other sensing devices or switches as sensor elements, including photo-electric sensors, etc.

Figure 4A:
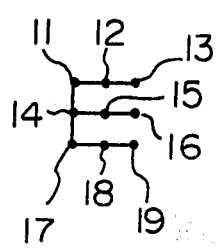
FIGS. 4A to 4D are diagrams for illustrating how the shapes of alphabetic letters may be represented by patterns comprising combinations of the connecting line inputs shown in FIG. 3.
Figure 4B:
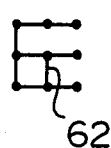
Figure 4C:
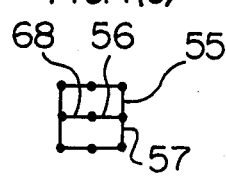
Figure 4D:
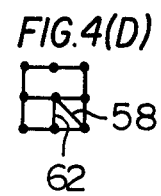

FIGS. 4(A), 4(B), 4(C) and 4(D) are diagrams for illustrating how the letters E, B, G and Q can be represented by patterns formed with an array of nine sensor elements such as that shown in FIGS. 1 and FIG. 2. It can be seen that, in tracing out each of these letters, all of the sensor elements 11 to 19 may be actuated in each case. Thus, if pattern recognition were to be performed on the basis of processing individual signals from sensor elements, i.e. as a combination of "point inputs", then it would not be possible to discriminate between the four patterns shown in FIGS. 4(A) to 4(D). However by processing each pattern by the method used in the present invention, i.e. as a combination of "connecting line inputs" based on the connecting lines shown in FIG. 3, discrimination between the patterns can be readily accomplished. For example, the pattern representing the letter G in FIG. 4(B) is distinguished from that representing the letter A in FIG. 4(A) by including the connecting line 62 (connecting lines being denoted herein in accordance with the reference numerals of FIG. 2, is distinguished from the pattern representing letter Q in FIG. 4(D) by the absence of diagonal connecting line 58, and is distinguished from the pattern representing the letter B in FIG. (C) by the absence of connecting lines 55 and 56. Similarly, the letter Q pattern in FIG. 4(D) is distinguished from the patterns for E, G and B by the presence of the connecting line 58. And in the same way, the pattern of letter A in FIG. 4(A) is distinguished from that of the letter B in FIG. 4(C) by the absence of connecting lines 55 and 57.

It can be seen that the "connecting line" input method of a data input device according to the present invention, whereby patterns are discriminated as combinations of connecting lines between pairs of sensor elements, can enable a large number of patterns to be distinguished from one another while only a relatively small number of sensor elements need be employed. Furthermore, as the number of sensor elements is increased, the number of connecting lines increases much more rapidly. For example, in the case of an array of three sensor elements, there will be only three connecting lines, but with 4 sensor elements there will be 6 connecting lines, and for the 9 sensor array of FIG. 3 there are 28 connecting lines. It will be apparent that for the case of a set of 3 connecting lines, up to a maximum of 8 possible patterns can be represented (including the case of the pattern having zero connecting lines). In general, a total of $2^n$ possible patterns can be generated with a set of n connecting lines, so that for the array of sensor elements of FIG. 3, with 28 connecting lines, up to $2^{28}$ patterns can be represented, i.e. 268,000,000. If each pattern is represented as a combination of "point inputs", i.e. individual sensor element actuations, then the maximum number of patterns which can be represented using an array of m sensors is $2^m$. In this case, for the array of 9 sensor elements of FIG. 3, only $2^9$, i.e. 512 different patterns can be represented. A vastly greater number of possible patterns can therefore be input by using the "connecting line input" method of a data input device according to the present invention than is possible with a prior art "point input" type of device, for a comparable number of sensor elements.

Figure 5:
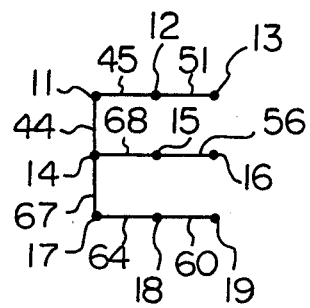
FIG. 5 is a diagram for illustrating how the capital letter E can be represented by a pattern of connecting lines.

Input of a pattern using the array of sensor elements in FIG. 3 will be further considered for the case of the letter E, with reference to FIG. 5. It will be apparent that there are various ways in which the pattern shown in FIG. 5 can be traced out. For example, the sensor elements may be successively actuated in the order 11, 12, 13, 11, 14, 17, 18, 19, 14, 15 and 16. Another possible sequence in which the pattern of FIG. 5 may be traced out is 11, 12, 13, 14, 15, 16, 16, 17, 18, 19, 11, 14 and 17. It is therefore apparent that the order in which signals representing the various connecting lines of the pattern in FIG. 5 are generated will vary in accordance with the manner in which the pattern is written, i.e. is traced out. It is therefore an important requirement for a data input device according to the present invention that each pattern will be correctly recognized irrespective of the order in which the sensor elements are actuated in inputting the pattern. As will be described hereinafter, this requirement is met by a data input device according to the present invention. In addition, an input pattern will be correctly recognized irrespective of the order in which each connecting line is traced out, i.e. a line which is drawn in the sequence of sensor element actuations 11 to 12 will be handled as being identical to a connecting line formed in the sequence 12 to 11. It will be apparent that this will make the input of data using such an input device simple and convenient, by comparison with data input devices of the prior art for which patterns must be traced out in a predetermined sequence in order to assure recognition.

Thus, in the case of the letter E, recognition is performed by a data input device according to the present invention only on the basis of presence or absence of the eight connecting line inputs 45, 51, 44, 67, 64, 60, 68, and 56, irrespective of the sequence in which these connecting line inputs occur. It is therefore not necessary to store a large number of patterns in the pattern memory corresponding to each of the various possible sequences of tracing out an input pattern, with a data input device according to the present invention, so that a large capacity pattern memory is not necessary.

Figure 6A:
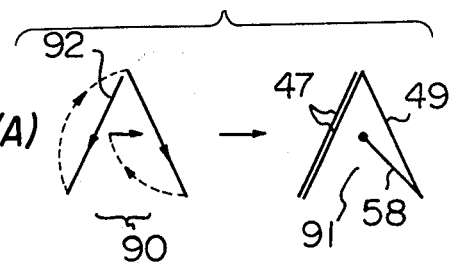
FIGS. 6A and 6B are diagrams for illustrating two ways in which the letter A can be represented by different combinations of connecting lines.
Figure 6B:
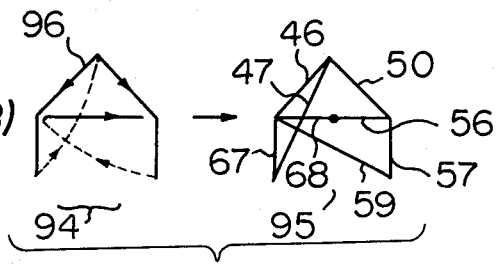

FIGS. 6(A) and 6(B) are diagrams for illustrating another point which must be considered in constructing a data input device according to the present invention, namely, the fact that certain letters such as the letter A (and numerals such as the number 9) may be written in a different shape by different individuals. This point is separate from the question of individual differences in handwriting characteristics, which will be considered hereinafter. The manner in which one pattern representing the letter A may be traced out is indicated by numeral 90 in FIG. 6(A). This will result in at least the connecting line inputs indicated by numeral 91 being generated, i.e. two repetitions of connecting line 47 and lines 49 and 58. Thus, in order to ensure recognition of this pattern as representing the letter A, it will be necessary to store the combination of connecting lines 47, 49 and 58 (i.e. data representing that combination) in the pattern memory of the data input device. The letter A may however also be input by tracing out the pattern denoted by numeral 94 in FIG. 6(B), in the sequence shown. In this case, the connecting line inputs will be as indicated by numeral 95, i.e. the connecting lines 46, 67, 47, 50, 57, 59, 68, 56. In order to recognize the pattern of FIG. 6(B) as representing the letter A, therefore, it will be necessary for the pattern memory of the data input device to store data representing the set of connecting lines 46, 67, 50, 57, 68 and 56.

Figure 7:
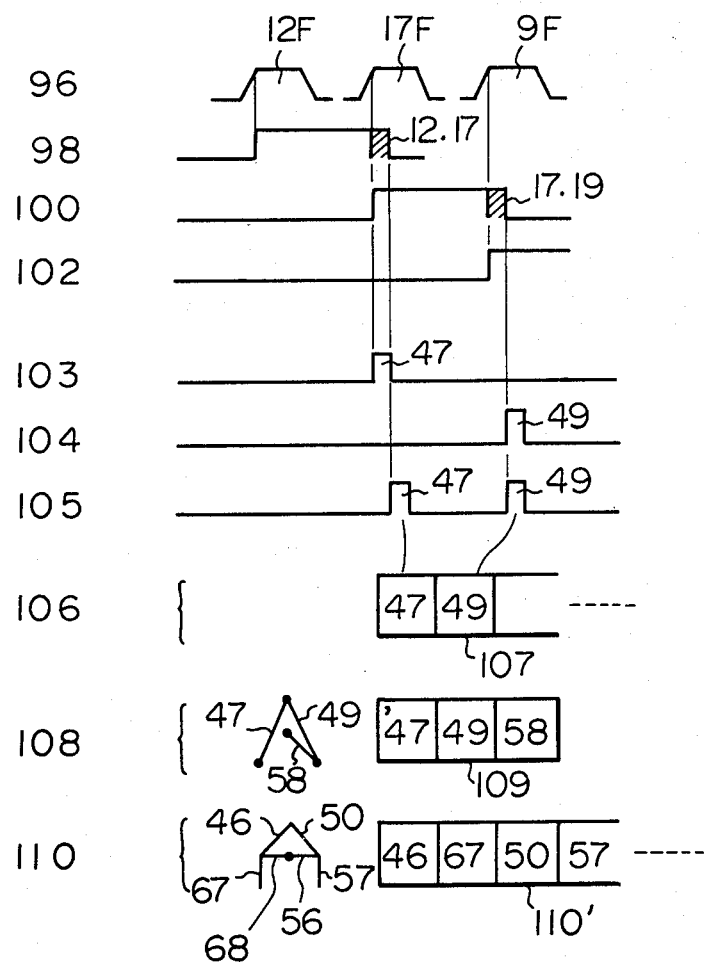
FIG. 7 is a diagram showing waveforms whereby sensor element input signals are converted into connecting line input signals, and how data representing combinations of connecting lines are stored in an input memory.

An embodiment of a data input device according to the present invention will now be described, with reference to FIG. 7 and FIG. 8. FIG. 8 is a general block diagram of the embodiment, while FIG. 7 illustrates various waveforms and memory contents of the embodiment of FIG. 8. In FIG. 8, numerals 112, 114, 116, 118 denote part of a set of high input impedance amplifier circuits, each having an input terminal coupled to a corresponding one of the sensor elements 11 to 19 shown in FIG. 1 and FIG. 3. The output from each of amplifier circuits 112 to 118 is coupled to an input of one of a set of delay circuits, partially indicated by numerals 128 to 134. In addition each output of amplifiers 112 to 118 is coupled to a "set" inputs of a corresponding one of a set of set-reset flip-flops partially indicated by numerals 120 to 126. The output signals from various pairs of these flip-flops 120 to 126 are coupled to inputs of corresponding ones of a set of AND gates partially indicated by numerals 140 to 144, whose outputs are applied to the inputs of a bit encoder circuit 148 and to inputs of an OR gate 146. Bit code patterns produced by bit encoder circuit 148 are written into an input memory circuit 150, which can comprise a shift register circuit, in response to output signals from OR gate 146. Numeral 154 denotes a pattern memory circuit having data representing a number of different patterns stored therein in a corresponding memory locations, with the data in each memory location representing a set of connecting lines which are distinctive to the pattern concerned. A comparator circuit 152 is coupled to compare the contents of pattern memory circuit 154 and input memory circuit 150, in response to control signals generated by means which are omitted from FIG. 8, for simplicity of description. A set of OR gates partially indicated by numerals 136 and 138 are also included. As shown, the reset terminal R of flip-flop 120 is coupled to the output from OR gate 136, while the inputs of OR gate 136 are coupled to receive output signals from all of delay circuits 130,132, etc, other than delay circuit 128. It can thus be seen that once flip-flop 120 has been triggered into the set condition, it will be reset when any sensor element other than sensor element 11 is actuated, after a certain time delay. In a similar way, the outputs from other OR gates such as 138 will act to reset flip-flops 122 etc, in response to actuation of any sensor element other than that which is operative to set that flip-flop.

The operation of the circuit of FIG. 8 will now be described. When one of the sensor elements 11 to 19 is actuated, then a pulse such as 12F (from amplifier circuit 112), 17F (from amplifier circuit 114), etc will be produced, as indicated by waveforms 96 in FIG. 7. When, for example such a pulse 12F is generated by actuation of sensor element 12, then flip-flop 122 will be triggered so that the output of flip-flop 122 will rise from a low logic level (hereinafter referred to as the L level) to a high logic level (hereinafter referred to as the H level), as indicated by waveform 98 in FIG. 7. This state of flip-flop 122 will continue until one of the other sensor element 11 to 19 is actuated. In the example of FIG. 7, sensor element 17 is actuated next, causing waveform 100 in FIG. 7 to be produced by the flip-flop coupled to the amplifier circuit of sensor element 17 (not shown in FIG. 8). An output signal is thereby produced from OR gate 138, after a certain time delay, which resets flip-flop 122 causing waveform 98 to return to the L level. The above time delay is indicated by the hatched region of waveform 98, designated as 12.17. Subsequently, the flip-flop coupled to the amplifier circuit of sensor element 19 is actuated, causing waveform 102 in FIG. 7 to be produced from that flip-flop. Waveform 100 from flip-flop 122 will therefore return to the L level after a time delay, indicated by hatched region 17.19.

One of the set of AND gates 140, 142, etc., is coupled to receive the signal waveforms 98 and 100 of FIG. 7, and will therefore produce an output pulse during the time interval 12.17. This output pulse, indicated by waveform 103 in FIG. 7, indicates that consecutive actuations of sensor elements 12 and 17 have occurred, i.e. that the connecting line 47 has been input (e.g. in forming the pattern of the letter A indicated by numeral 108 in FIG. 7), and the pulse is therefore indicated by numeral 47 in FIG. 7. Similarly, one of the set of AND gates 140, 142, etc, will produce an output pulse, as indicated by waveform 104, in response to the simultaneous H level state of both of waveforms 100 and 102 during the interval designated 17.19, and since this pulse indicates that the connecting line 49 has been traced out by successive actuations of sensor elements 17 and 19, it is designated by numeral 49. In response to these pulses 47 and 49, the waveform 105 will be produced by OR gate 146, i.e. successive pulses, while bit encoder 150 will generate a specific bit code pattern in response to each of pulses 47 and 49, and these bit code patterns will be successively stored in locations of input memory circuit 150 as indicated by section 107 of FIG. 7. In a similar way, when the third connecting line 58 of the letter A pattern shown in FIG. 6(A) is traced out, a bit code pattern representing that connecting line will be stored in a location of input memory circuit 150, as indicated by section 109 of FIG. 7.

Upon completion of input of this pattern, the comparator circuit 152 will successively compare the set of bit code patterns stored in input memory circuit 150 with the various sets of connecting lines stored in pattern memory circuit 154 representing various different patterns. When the contents of input memory circuit 150 are detected as corresponding to the stored pattern for the letter A having the form shown in FIG. 6(A), then output data identifying the input pattern as being the letter A will be produced from output 155 of comparator circuit 152, and transferred to other circuitry which will process or display the input data.

Similarly, if the letter A is input in the form shown in FIG. 6(B), then the contents of input memory circuit 150 will be as indicated by numeral 110' in FIG. 7, i.e. will contain data representing the set of connecting lines 46, 67, 50, 57, 67, 68, and 56. This data is then compared with the contents of pattern memory circuit 154, and when it is found to correspond to a set of connecting lines representing the letter A, pattern identifying data will be generated from output 155 of comparator circuit 152.

Referring now to FIG. 9, numerals 156 to 164 therein denote a set of input patterns, based on the nine sensor elements 11 to 19 of FIG. 2, which can represent the letters I, Z, S, B and O, respectively. However this group of patterns can also represent the numerals 1, 2, 5, 8 and 0 respectively, so that discrimination between the letter I and numeral 1, or between the letter Z and numeral 2, etc, will present problems. Various methods have been used in the prior art to overcome such problems, including the use of a changeover switch for selectively designating an input pattern as representing a numeral or a letter, using separate arrays of sensor elements for numerals and letters, increasing the number of sensor elements so that curved lines in input patterns can be distinguished, or providing means for discriminating between different sequences of inputting portions of an input pattern. However all of such prior art methods of overcoming this problem involve inconvenience to the user, and may also cause increased complexity and hence increased manufacturing cost.

The present invention overcomes this problem, however, while avoiding the disadvantages described above. This is accomplished by using a sub-set of the total set of sensor elements to input patterns representing numerals, as is illustrated in FIG. 10. Here, only the set of six sensor elements comprising the right-hand half of the array of sensor elements 11 to 19 shown in FIG. 1 and FIG. 2 (i.e. sensor elements 12, 13, 15, 16, 18 and 19) are used to input numerals. Thus, to input the numeral 2, for example, the sensor elements 12, 13, 18, and 19 are successively actuated. To input the letter Z, however, sensor elements 11, 12, 13, 15, 17, 18 and 19 are successively actuated. In this way, although the letter Z and numeral 2 are input by tracing out basically identical patterns, the data which will be input in each case will be different. It will of course be apparent that it is equally possible to limit the input of patterns representing numerals to some other sub-set of the array of sensor elements 11 to 19, for example the left-hand six sensor elements 11, 12, 14, 15, 17 and 18.

It is also possible to provide some additional sensor elements, which are only actuated when a numeral is input.

It will be apparent that this method of ensuring discrimination between letters and numerals having similar shapes does not result in inconvenience to the user, and no increase in complexity of the data input device.

FIG. 11 is a diagram for illustrating the operation of the data input device shown in FIG. 8, for the discrimination arrangement between numerals and letters described above. When the numeral 2 is input, by tracing out the pattern indicated by numeral 188 in FIG. 11, then first sensors 12 and 13 are successively actuated, causing pulses 12F and 13F to be successively generated by amplifier circuits 114 and 116, whereby flip-flops 122 and 124 are successively triggered. A pulse denoted by numeral 51 is thereby output from one of the set of AND gates 140, 142, ..., and as a result data representing input line 51 is stored in input memory circuit 150. Subsequently, data representing connecting lines 54 and 60 is stored successively in input memory circuit 150. Comparison of the contents of input memory circuit is then performed with the contents of pattern memory circuit 154, by comparator circuit 152 as described above, until correspondence is detected with a pattern representing the numeral 2, stored in pattern memory circuit 154. Data identifying the input pattern as being the numeral 2 is then output from comparator circuit 152.

When the letter Z is input as the pattern indicated by numeral 190 in FIG. 11, then the data which will be stored in input memory circuit 150 will represent the set of connecting lines 45, 51, 53, 66, 64 and 60. It will thus be apparent that comparator circuit 152 can readily discriminate between data stored in input memory circuit 152 representing a numeral and data stored therein which represents a letter having a similar configuration to the numeral, since a completely different set of connecting lines is represented by the contents of input memory circuit 150 in these two cases.

Figure 12:
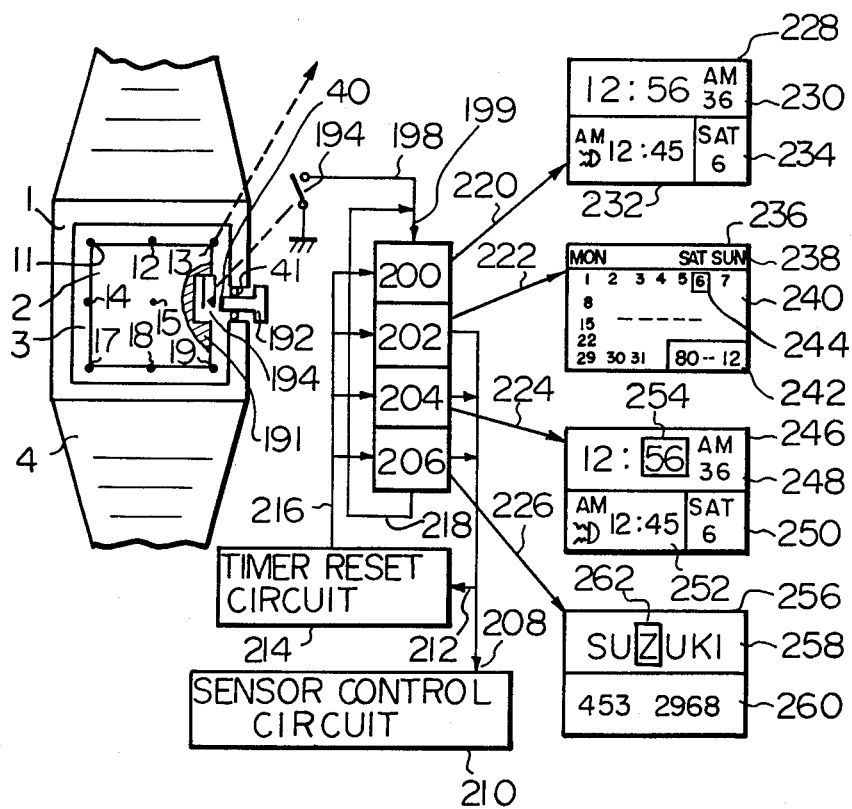
FIG. 12 is a diagram for illustrating an embodiment of a data input device according to the present invention comprising an electronic timepiece having a plurality of peripheral sensor elements which are converted from a normally non-operative condition to an operative condition in response to a change in the timepiece display mode.

In the case of sensor elements which comprise touch-sensitive sensor electrodes, as in the embodiment of a timepiece of FIG. 1 and FIG. 3, it is necessary to maintain the sensor electrodes at a different potential from the watch case, in order to generate signals by conduction through the human body when a sensor electrode is touched. This can result in leakage currents flowing between the sensor electrodes arranged around the periphery of the watch glass, i.e. as denoted by numerals 11, 12, 13, 14, 16, 17, 18 and 19 in FIG. 1, while these electrodes are in the operating state. It is desirable to reduce the effects of such leakage currents to the minimum possible degree, in order to prevent battery lifetime being reduced. Means will now be described whereby sensor element of a data input device according to the present invention can be held in a normally non-operative condition, and can be set into an operative condition only when it is required to input data using the data input device. Referring first to FIG. 12, a digital display electronic timepiece having a multimode display capability is shown, which incorporates a data input device according to the present invention. This timepiece includes a mode changeover switch mechanism 191, comprising a push-button 192 and switch contacts 194. When contacts 194 are actuated by depressing push-button 192, a signal is applied over a line 198 to a count input of a counter circuit 199, which can comprise for example a ring counter circuit. The count status of counter circuit 199 serves to control the display mode of the timepiece, and can be changed by applying successive signals over line 198 by actuation of push-button 192. Thus, when the count state of counter circuit 199 is such that stage 200 produces an output at the H level, with the remaining stages 202 to 206 producing outputs at the L level, then the timepiece is held in the normal time display mode, denoted by numeral 228, in which the current time, date, and a preset alarm time are indicated. When the output from stage 202 of counter circuit 199 goes to the H level in response to actuation of push-button 192, then a calendar display is entered. When the output from stage 204 of counter circuit 199 is at the H level, then a time correction display mode 246 is entered, in which the current time or preset alarm time can be altered by the user. When stage 206 of counter circuit 199 is set to give an H level output, then a telephone memo display mode is entered, as indicated by numeral 256. In this mode, if push-button 192 is actuated, the timepiece will be restored to the normal time display mode, as a result of a signal applied over line 218 to the count input terminal of counter circuit 199. When the timepiece is in the normal time display mode 228, then the sensor elements 11 to 19 are held in the non-operative state, i.e. effectively disconnected from the battery of the timepiece. When any of the other display modes 236, 246 or 256 is entered, then an output signal produced by counter stages 202, 204 or 206 is applied over a line 208 to a sensor control circuit 210, which thereby is actuated to set the sensor elements 11 to 19 in the operative state, in which input of data in the form of patterns can be performed as described hereinabove. Thus, in the normal time display mode, no leakage current will flow through the sensor elements 11 to 19 to the timepiece case.

When sensor control circuit 210 is actuated to set sensor elements 11 to 19 in the operative state, a timer reset circuit 214 is also actuated, and after a predetermined time interval an output signal from timer reset circuit 214 acting over line 216 operates to reset the counter circuit 199 so that the timepiece returns to the normal time display mode. Thus, even if the user should accidentally leave the timepiece in one of the modes in which the sensor elements 11 to 19 are operative, return will be automatically performed to the normal time display mode in which the sensor elements are non-operative, so that there is no danger of accidental battery power consumption due to leakage currents through the sensor elements.

While the timepiece is in the calendar display mode 236, a marker 244 is displayed around one of the digits of the dates. Marker 244 can be moved to any desired date by actuating sensor elements 11 to 19 in a predetermined manner, and the current date thereby corrected if required. Correction of the year and month indicated in section 244 is also possible, by setting the marker 244 over the digit to be corrected and then inputting the desired correct digit using sensor elements 11 to 19 as described hereinabove.

With the timepiece set in the time correction mode 246, a marker 254 appears around one of the digits of the display, indicating that the digit can be corrected by input of a desired numeral through sensor elements 11 to 19. Marker 254 can be moved to any desired digit by actuation of sensor elements 11 to 19 in a predetermined manner, so that the current time appearing in section 248 of the display, or the preset alarm time appearing in section 252 can be set to any desired time.

Similarly, when the timepiece is set in the telephone memo display mode 256, a marker 262 appears over one of the letters or numerals displayed, and can be moved to indicate any desired letter or numeral by suitable actuations of sensor elements 11 to 19. The letter or numeral thus indicated can then be altered as required, by input of a pattern through sensor elements 11 to 19.

Figure 13A:
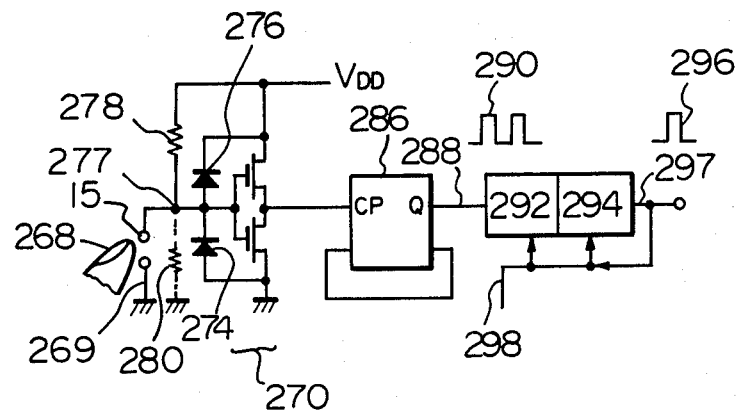
FIG. 13A is a circuit diagram illustrating another embodiment of the present invention whereby a command signal may be generated for converting normally non-operative sensor elements to the operative condition by two successive actuations of a centrally disposed sensor element.

In the above embodiment, a pushbutton switch is utilized to cause changeover of display mode and to thereby set the sensor elements 11 to 19 in the operative condition. However, the problem of leakage currents between sensor elements and the timepiece case 1 will only arise in the case of the peripheral sensor elements 11, 12, 13, 14, 16, 17, 18 and 19. It is therefore possible to leave the central sensor element 15 permanently in the operative condition, without the danger of current being drawn from the timepiece battery. In this case, it becomes possible to utilize actuation of central sensor element 15 to generate a mode changeover signal, corresponding in function to that produced by switch mechanism 191 and applied to counter circuit 199 over line 198 in the embodiment of FIG. 12. A practical circuit for implementing this is shown in FIG. 13A. Here, numeral 269 denotes a conductive path which is formed between center sensor element 15 and the ground potential of case 1 when a finger 268 touches sensor element 15. Sensor element 15 is normally held at a predetermined potential different from ground potential, by being coupled through a resistor 278 to the battery potential Vdd, while sensor element 15 is in the operative condition. Numeral 270 denotes an amplifier stage comprising a pair of field-effect transistors (abbreviated hereinafter to FETs) having their gate electrodes coupled in common to sensor element 15. In addition, two protective diodes 274 and 276 are connected across each FET of this amplifier stage, between gate and source electrodes, to prevent damage to the FETs being caused by a high static electric charge building up on the body or clothing of the user and being applied to sensor element 15. The output of amplifier stage 270 is applied to the trigger input CP of a one-shot multivibrator 286, which performs a waveform shaping function by producing a single pulse for each actuation of sensor element 15 by finger 268. The output pulses from one-shot multivibrator 286 are applied to a two-stage counter circuit 291 composed of counters 292 and 294, which produces a single pulse, as denoted by numeral 296, in response to two successive pulses 290 from multivibrator 286. Output pulse 296 sent over line 297 is then utilizable to initiate operation of peripheral sensor elements 11, 12, 13, 14, 16, 17, 18 and 19, by activating for example a sensor control circuit 210 shown in FIG. 12, in the same way as the output signal from switch mechanism 191. In other words, pulse 296 can be applied to the count input of a display mode control counter such as counter circuit 199 of FIG. 12. It can thus be seen that by applying two successive actuations of sensor element 15, the peripheral sensor elements of the display device can be changed from the non-operative into the operative state, in the same way as a separate push-button switch can be used to perform such a changeover.

Figure 13B:
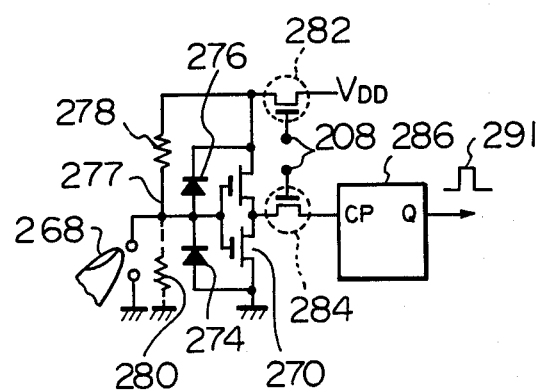
FIG. 13B is a circuit diagram illustrating an input and waveform shaping circuit for peripheral sensor elements which includes means for rendering the elements non-operative.

FIG. 13B shows an input amplifier circuit which can be coupled to each of the peripheral sensor elements to provide a single output pulse in response to each actuation of a sensor element. This circuit is basically similar to that of FIG. 13A, but includes means for rendering the corresponding sensor element inoperative, comprising a transmission gate 282, having a control electrode 208 which can be coupled to sensor control circuit 210 of the example of FIG. 12 for selectively applying battery potential Vdd to amplifier stage 270 and resistor 278. Another transmission gate 284 can also be incorporated between the output of amplifier stage 270 and the trigger terminal of one-shot multivibrator 286, if desired, to completely isolate the sensor element concerned from the rest of the data input device circuitry while that sensor element is in the non-operative state. In the operative state, one-shot multivibrator 286 produces a single output pulse in response to each actuation of the sensor element concerned. When the sensor element is held in the non-operative state, no leakage current can flow from that sensor to case ground potential, since the sensor element is isolated from the timepiece battery by transmission gate 286.

Figure 14:
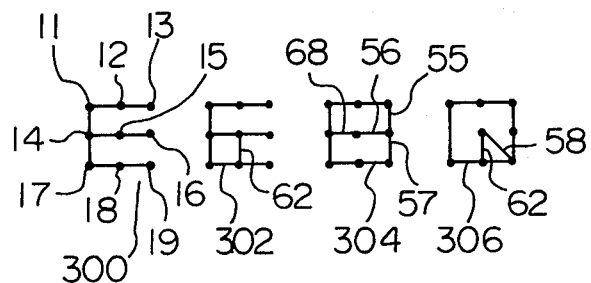
FIGS. 14, 15 and 16 are diagrams for illustrating an arrangement in a data input device according to the present invention whereby each of a plurality of characters or numerals are represented in a pattern memory circuit as minimum combinations of connecting lines which are uniqe to each character or numeral within the pattern memory contents.
Figure 15:
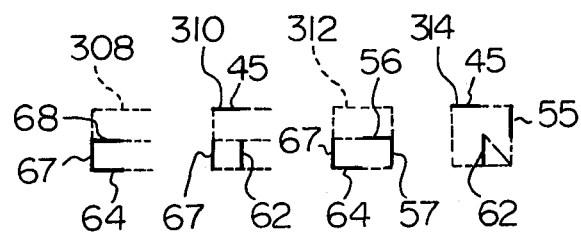

Referring now to FIG. 14, diagrams illustrating the letters E, G, B and Q formed by means of connecting lines between an array of nine sensor elements are shown, i.e. input patterns representing these letters, formed using the set of connecting lines shown in FIG. 2. It can be seen that the pattern for the letter G, denoted by numeral 302, is distinguished from that for the letters E and B by including connecting line 62. Similarly, pattern 306 for the letter Q is distinguished from those of letters E, G and B by including the connecting 58. Similarly, the letter B is distinguished from the patterns for letters G and E by including the connecting lines 55 and 57. It is possible to discriminate between such different patterns if each complete pattern is stored in the pattern memory circuit 154 of FIG. 8. However this will require an unnecessarily large memory capacity, since, as will be shown hereinafter, discrimination between the different patterns can be performed if portions of each pattern which are distinctive to that pattern are stored in the pattern memory, and if a suitable procedure is adopted for sequentially comparing the contents of pattern memory circuit 154 with an input pattern. In other words, if a set of connecting lines which is unique to each pattern is stored in the pattern memory circuit, then discrimination between different patterns is possible, without it being necessary to store a complete set of connecting lines for each pattern. Such an arrangement, in addition to reducing the amount of pattern memory capacity required, will also enable the time required for pattern comparison to be minimized. An example of such a pattern storage arrangement, for the letters E, G, B and Q, is shown in FIG. 15. Here, the full line portions indicate connecting lines which are stored in the pattern memory 154, while broken lines indicate portions of a pattern which are traced out when the pattern is input, i.e. which become stored in the input memory circuit 150, but are not held in pattern memory circuit 154. Thus, the set of connecting lines 68, 67 and 64 are stored to represent the letter E in pattern memory circuit 154, connecting lines 45, 67 and 62 are stored to represent the letter G, connecting lines 67, 64, 56 and 57 to represent the letter B, and connecting lines 45, 55 and 62 to represent the letter Q. Each of these partial sets of connecting lines is unique among all the other patterns stored in pattern memory circuit 154 to represent the letters of the alphabet. Thus, for example, when the pattern for the letter G is input using sensor elements 11 to 19, this can be distinguished from the pattern for the letter B by the presence of connecting line 62, can be distinguished from the pattern for the letter B by the absence of connecting line 67, and can bee distinguished from the pattern for the letter Q by the absence of connecting line 55. The same will be true for this input pattern representing the letter G with respect to all of the other alphabetic letters. It can thus be understood that with a data input device according to the present invention, it is not necessary to store a complete set of connecting lines for each pattern representing data in the pattern memory circuit, but only a partial set of connecting lines which is unique to that pattern. This enables a substantial reduction in memory capacity to be achieved, and makes pattern recognition simpler and more rapid.

Figure 16:
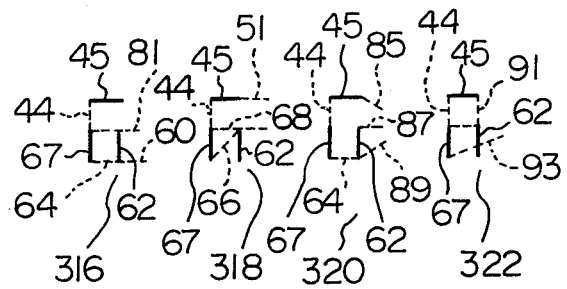

Referring now to FIG. 16, four different patterns by which the letter G may be input are denoted by numerals 316, 318, 320 and 322. Each of these patterns represents the letter G as written in a different style of handwriting, but each contains the unique set of three connecting lines 45, 67 and 62 which distinctively represent the letter G, although these input patterns include various other connecting lines, shown as broken lines. Thus, input pattern 316 comprises, in addition to the set of connecting lines 45, 67 and 62, the additional lines 44, 64 and 81. Similarly, pattern 318 includes the additional lines 51, 44, 66, and 68, and pattern 320 incudes additional connecting lines 86, 44, 64, 89 and 67, while pattern 322 includes additional lines 91, 44 and 93. These additional lines may be of any arbitrary length and orientation, depending only on handwriting characteristics of the user. However, so long as the input pattern includes the set of connecting lines which is unique to the letter, numeral or symbol concerned (i.e. in this case the set 45, 67 and 62), then the pattern will be correctly recognized.

Figure 17:
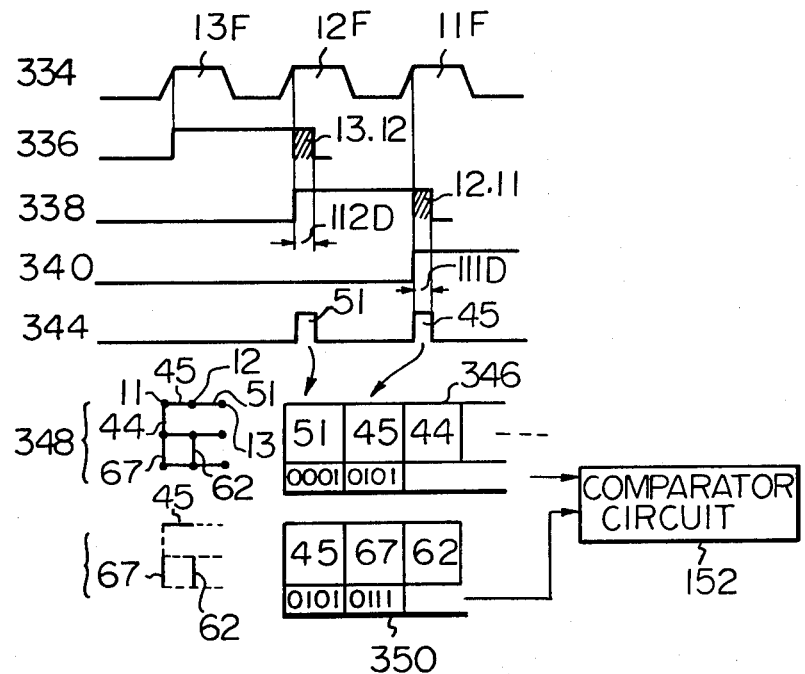
FIG. 17 is a diagram for illustrating input waveforms and input memory circuit contents for the case of the arrangement described with reference to FIGS. 14, 15 and 16.
Figure 19:
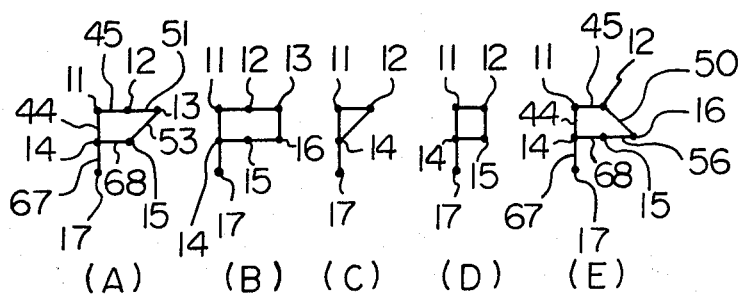
FIGS. 19, 20 and 21 are diagrams for illustrating the manner in which a plurality of combinations of connecting lines can be stored in the pattern memory circuit of a data input device according to the present invention, representing different input patterns which may occur for a single letter as a result of differences in handwriting styles.

FIG. 17 is a diagram for illustrating the process of comparison between the contents of pattern memory circuit 154 and those of input memory circuit 150 for the case of partial sets of connecting lines being utilized as described above. Waveforms 344 illustrate the first of a series of consecutive pulses which are generated by actuations of sensor elements 11 to 19 in tracing out the pattern denoted by numeral 344, to input the letter G. As described hereinabove, this results in pulses 51, 45 etc being generated, representing connecting lines 45, 51, etc., of that pattern. Thus, the contents of input memory circuit 150 will become as partially indicated by numeral 346, i.e. data representing connecting lines 51, 45, 44, etc., will be successively stored therein. However, since only a partial set of connecting lines 45, 67 and 62 is stored in pattern memory circuit 154, the contents of this memory representing the letter G will be as denoted by numeral 350. The form in which each connecting line is represented in the input and pattern memory circuits may be as shown in FIG. 17, i.e. with the connecting lines 51, 45, and 67 being represented by the bit code patterns 0001, 0101 and 0111 respectively. Upon completion of inputting the pattern representing the letter G, the set of bit code patterns stored in input memory circuit 150 will be compared with the sets of bit code patterns representing various partial sets of connecting lines stored in pattern memory circuit 154, by comparator circuit 152, and when correspondence is detected, data identifying the input pattern as representing the letter G wil be output by comparator circuit 152.

FIG. 18 is a diagram illustrating how each of the capital letters of the alphabet and each of the numerals from 0 to 9 can be represented by a partial set of connecting lines which is unique to that character or numeral, as described hereinabove. It should be noted that this system of using partial sets of connecting lines with a data input device according to the present invention can also be applied to the input of lower case alphabetic letters, or to input of characters of other languages such as the Japanese kana and hiragana characters.

In the above description of a system for representing letters or numerals by partial sets of connecting lines, it has been assumed that each user will always write in a pattern of connecting lines, when inputting patterns, in such a way that the unique partial set of connecting lines for that pattern will be input, in spite of differences in individual handwriting style. However, this may excessively restrict the freedom with which the user can write in data using a data input device according to the present invention, and in order to provide increased flexibility and ease of use of such a data input device it is desirable that a letter or numeral can be traced out by the user in various different ways, to suit his particular style of writing. In this case, it is still possible to use the arrangement described above of employing partial sets of connecting lines to represent each pattern, however it will be necessary in some cases to store a plurality of such partial sets of connecting lines to represent one pattern. This will be made mre apparent by reference to FIGS. 19, 20 and 21. FIG. 19(A) to (E) show five different input patterns which may be traced out using the sensor elements 11 to 19 to input the letter P, with the patterns varying in accordance with individual handwriting styles. It can be seen that different sensor elements are actuated in each case, i.e. in FIG. 19(A), connecting lines 44, 67, 45, 53 and 68 are actuated, while for the pattern of FIG. 19(E), connecting lines 44, 67, 45, 50, 56 and 20(D) 68 are actuated. FIGS. 20(A), 20(B), 20(C), 20(D) and 20E show partial sets of connecting lines, each of which represents the letter P, and each of which is unique with respect to the other partial sets of connecting lines representing the letter P, and with respect to sets of connecting lines representing the other letters and numerals.

It will be apparent that each of the partial sets of connecting lines which uniquely defines a particular letter, numeral or symbol, or which defines a particular variant of such a letter, numeral or symbol resulting from variations in individual handwriting characteristics, must be selected based on consideration of the configuration of each of the other patterns which will be stored in the pattern memory circuit of the data input device.

Figure 20:
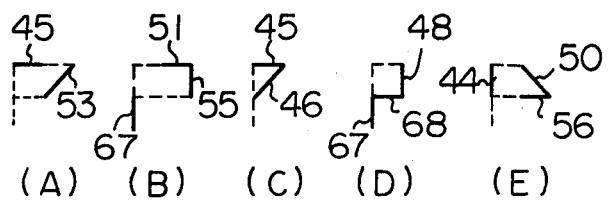
Figure 21:
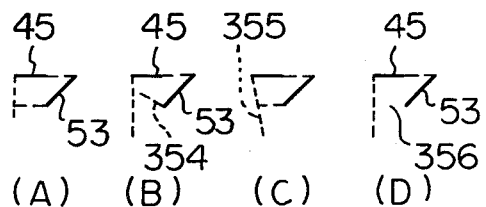

As illustrated in FIG. 21, each of the partial sets of connecting lines shown in FIG. 20 which represent the letter P can be written (i.e. traced out by successive actuation of sensor elements) in a number of different ways. Each of these different patterns will be recognized as representing the letter P, so long as the uniquely distinctive set of connecting lines of that particular variant in shape of the letter P is input. Thus, although the input pattern of FIG. 21(A) contains a diagonal line 354 which is not present in the pattern of FIG. 21(A), both of these input patterns will be recognized by comparator circuit 152 as representing the letter P (i.e. as corresponding to the shape variant of the letter P shown in FIG. 19(A)), since the patterns of both FIGS. 21(A) and 21(B) include the unique set of connecting lines 45 and 53. Similarly, the patterns shown in FIGS. 21(C) and 21(D) will also be recognized as corresponding to the letter P shape of FIG. 19(A), although the pattern of FIG. 21(C) contains a sloping line 355 and that of FIG. 21(D) lacks one of the connecting lines present in the other three patterns, as indicated by numeral 356. However all of these patterns of FIG. 21 will be recognized as representing the letter P, so long as the set of connecting lines which uniquely define that particular shape variant of the letter P are stored in pattern memory circuit 154.

Thus, by storing a plurality of partial sets of connecting lines defining various shapes in which a pattern such as a letter may be entered into a data input device according to the present invention, it becomes unnecessary to restrict the manner in which the user must trace out each letter or numeral. This will considerably simplify the use of such a data input device, and thereby enable it to be used by a wide range of individuals without specialized training being required.

Figure 22:
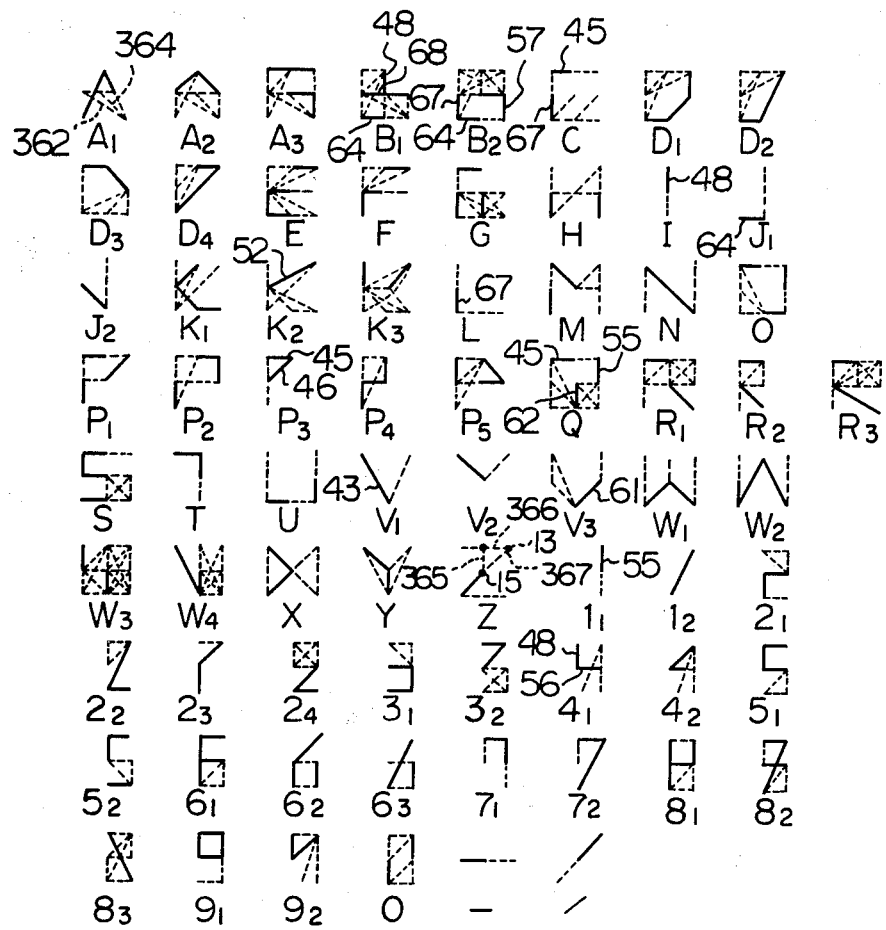
FIG. 22 is a diagram for illustrating how minimum combinations of connecting lines, for each of a variety of patterns corresponding to letters or numerals input using different styles of handwriting, can be stored in a data input device according to the present invention for thereby enabling recognition of each of the patterns.

FIG. 22 is a diagram to illustrate how each of the capital letters and also the numerals from 0 through 9 can be represented by partial sets of connecting lines, as indicated by the full-line portions, with some letters or numerals being representable by a plurality of different patterns corresponding to different handwriting variants. Thus the letter A can be input to the data input device by tracing out any of the shapes A1, A2 or A3, the letter B can be input by using either of patterns B1 or B2, and so on. In each case, lines which may be traced out by the user while inputting a letter or numeral, but which do not form part of a uniquely defining set of connecting lines, are indicated by broken lines, i.e. a indicated by numeral 362 for the pattern A1. Broken line portions such as portion 362 also indicate movements made in tracing out a pattern which do not directly form part of that pattern. For example, in tracing out the letter A using an array of sensor elements such as 11 to 19 of the embodiment of FIG. 1, for example, formed on an electrode plate (e.g. the watch glass 1 of FIG. 1), the user will normally remove his finger from the electrode plate after tracing out the diagonal line 364, before tracing out the horizontal line portion of the letter A. Broken line portions such as that denoted by numeral 362 may also therefore indicate such "spaces" which occur in tracing out an input pattern.

Similarly, while tracing out the letter Z, the user may accidentally fail to touch sensor element 13, and therefore fail to input the connecting lines 366 and 367. This possibility is indicated by the broken line portion 365. Thus, for each of the patterns shown in FIG. 22, the set of broken lines and full lines indicates all of the possible lines which may be traced out in inputting that pattern. It can thus be seen that some of these sets of full and broken lines for one pattern may overalap the set of connecting lines which define some other pattern. For example, the set of connecting lines shown for the letter C will overlap the uniquely defining sets of connecting lines for the letters $J_1$, L and $V_3$. Similarly, the pattern fro the letter $P_3$ may overlap the uniquely defining set of cnnecting lines for the letters C and L. It is therefore necessary for the comparator circuit of a data input device according to the present invention to be able to discriminate between such overlapping sets of connecting lines in order to correctly identify the various patterns. In order to perform such discrimination, it is necessary for the comparator circuit to sequentially compare the contents of input memory circuit 150 and pattern memory circuit 154 in a particular predetermined sequence. It is essential to such a comarison sequence that, for example, the input pattern representing the letter C be compared with the stored pattern for the letter C, before being compared with the stored patterns for letters $J_1$, L or $V_3$. On the other hand, the patterns for $J_1$ and $V_3$ do not mutually overlap, so that it is not important which of these is placed first in the pattern comparison sequence. Similarly, the connecting lines for the pattern $P_3$ overlap those of letter C, so that the $P_3$ pattern must precede that of C in the pattern comparison sequence. Thus, for the five patterns concerned, the order of pattern comparison should be $P_3$, C, L, $J_1$, and $V_3$. In other words, the contents of input memory circuit 150 should (after comparison with patterns having precedence over that of $P_3$) be compared with the stored partial set of connecting lines which uniquely define $P_3$, then with the stored set of connecting lines which define the letter C, then those defining L, $J_1$, $V_3$ and so on.

From the above it can be understood that in order to determine the order in which a pattern should be placed within the sequence of pattern comparison, it is necessary to consider all of the possible connecting lines which may be traced out when the pattern is input, i.e. the complete combination of broken line and full line portions for that pattern appearing in FIG. 22. In general, the pattern which will overlap the maximum number of other patterns when input should be placed first in the order of pattern comparison. For the patterns of FIG. 22, this is the pattern $B_2$. In other words, each input pattern which is written into input memory circuit 150 should first be compared with the uniquely defining set of connecting lines for pattern $B_2$ (i.e. connecting lines 56, 57, 64 and 67). Furthermore, the pattern which is overlapped by the maximum number of other patterns should be placed last in the order of pattern comparison. For the patterns shown in FIG. 22, this is pattern $1_1$.

The above can be understood by noting that the pattern $B_2$ overlaps each of the following patterns: $A_3$, C, $D_3$, E, F, H, I, $J_1$, $K_2$, $K_3$, L, M, O, $P_1$, $P_2$, $P_3$, $4_4$, $P_5$, S, T, U, $V_2$, $1_1$, $3_1$, $3_2$, $4_1$, $4_2$, $7_1$, -, and /. In other words, pattern $B_2$ overlaps 30 other patterns.

Pattern $1_1$, on the other hand, is overlapped by the following patterns: $A_3$, $B_2$, $D_1$, H, M, N, O, $P_2$, Q, $R_1$, $R_3$, U, $V_3$, $W_1$, $W_2$, $W_3$, $W_4$, $2_1$, $2_4$, $3_1$, $4_1$, $4_1$, $7_1$, $8_1$, $8_3$, $9_1$, $9_2$, and O.

Based on the above considerations, the order of pattern comparison with a data input device according to the present invention, for the 71 patterns shown in FIG. 22 should be as follows:

$B_2, B_1, Q, G, W_4, X, W_1, W_2, Y, Z, 2_4, E, S, O, A_3, W_3,$ $R_1, R_3, N, M, R_2, D_2, 8_1, 9_1 6_1, D_1, P_2, P_5, D_3, A_2, D_4,$ $P_1, K_1, P_4, 9_2, A_1, 8_3, 8_2, 6_3, U, H, K_3, F, P_3, 6_2, 2_1, O,$ $2_3, 3_2, 4_2, 2_2, 7_2, 5_1, 5_2, 3_1, 7_1, 4_1, C, V_3, K_2, L, J_1, V_1, T,$ $J_2 V_2, -, I_2, /, 1_1.$

The patterns shown in FIG. 22 are based on an array of nine sensor elements as shown in FIG. 2, with numerals being represented by patterns formed using a sub-set of six sensor elements, in order to facilitate discrimination between numerals and letters as described hereinabove. From the above it can be understood that by utilizing an appropriate sequence for sequentially comparing patterns represented by sets of connecting lines stored in a pattern memory with a set of connecting lines representing an input pattern, it becomes possible to store only a partial set of lines for each pattern in the pattern memory, with the pattern comparison sequence serving to ensure that each partial set of lines will uniquely distinguish each pattern from the others in the comparison process.

Figure 23:
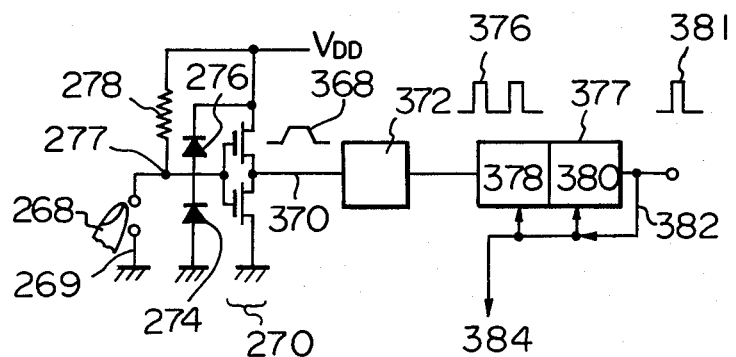
FIG. 23 is a diagram of a circuit for generating a delimiting signal to indicate completion of input of a pattern, through two successive actuations of a predetermined sensor element.

With a data input device according to the present invention, it is necessary to provide some means for instructing the comparator circuit to initiate a pattern comparison procedure upon completion of inputting a pattern using the sensor elements. With prior art types of pattern recognition device, this has been accomplished in various ways. One such way has been to arrange that the circuitry waits for a predetermined time interval after each actuation of a sensor element. If no other actuation of a sensor element occurs within that time interval, it is assumed that completion of input of a pattern has been accomplished, and pattern recognition processing is started. Thus, after the user has input a pattern representing a letter or numeral, etc., he must wait for a certain time interval before beginning input of the next pattern. Alternatively, a push-button switch can be provided which generates a delimiting signal when acutated, to instruct the device circuitry that input of a character has been completed. However, such prior art methods involve either inconvenience to the user or additional complexity and cost of the input device. With a data input device according to the present invention, such problems of the prior art can be effectively overcome, as will now be described. FIG. 23 is a circuit diagram of a circuit whereby a delimiting signal to indicate completion of input of a pattern can be generated, after a pattern representing a letter, numeral or symbol has been traced out using for example the array of sensor elements 11 to 19 of FIGS. 1 and 2. The signal is generated by the user successively actuating one of the sensor elements, e.g. in this case sensor element 19, twice in succession, i.e. by touching the sensor twice in succession. This results in output of two pulses from waveshaping circuit 372, which are counted by two-stage counter circuit 377 to produce a delimiting signal pulse 381. This signal serves to instruct the comparator circuit of the data input device to initiate comparison of the input pattern with the contents of the pattern memory circuit, as described hereinabove. It will be observed that the circuit of FIG. 23 is identical to that of FIG. 13A, and that it is possible to use any of the sensor elements including, if desired, central sensor element 15 to generate such a delimiting signal.

An alternative method of generating a delimiting signal is to actuate two or more sensor elements simultaneously. A circuit for implementing such a method is shown in FIG. 24. Here, simultaneous actuation of sensor elements 13 and 15 will result in output pulses being generated simultaneously from waveform shaping circuits 390 and 392 in response to output signals from input amplifier circuits 386 and 388. A pulse is thereby output from AND gate 394, as denoted by numeral 396, which can be used to initiate pattern comparison processing.

It can be seen that either of the arrangements described above for generating a delimiting signal for a data input device according to the present invention is simple to implement and convenient for the user, who need only tap one of the sensor elements twice in succession upon completion of tracing out an input pattern, before beginning input of the next pattern, or simply touch two of the sensor elements simultaneously. Neither method involves appreciable increase of device complexity or cost.

In addition to the input of patterns representing letters, numerals or symbols, it is also possible to use a data input device according to the present invention for inputting commands to circuits connected thereto. For example such commands can control the operation of a display device which displays data that is input using the data input device. Such control can include the moving upward or downward of lines of displayed characters or numerals, etc. Input of such commands can be accomplished by performing any data input operation using the sensor elements which could not occur during the input of data comprising letters, numerals or symbols, such as simultaneous actuation of two or more sensor elements (the generation of a delimiting signal as described hereinabove can be regarded as a form of command input, for instructing commencement of pattern comparison processing). Similarly, two or more consecutive inputs of a connecting line (i.e. as shown in FIG. 2) will not occur during normal input of a letter, numeral or symbol, and can therefore be used for command input.

Various examples of such command inputs are shown in FIGS. 25(A) to (I). Thus, as illustrated in FIG. 25(A), two consecutive actuations of sensor element 9 can be used to generate a command input. If the data input device is integral with an electronic watch having a telephone memo facility, such as has been described with reference to FIG. 12, then the command thus input can serve as a "right shift" command for moving memo information on the timepiece display to the right. Similarly, two consecutive actuations of sensor element 7 can serve as a command input designating "left shift" of the displayed characters. Two consecutive actuations of of sensor element 18, as in FIG. 25(C) can serve as a "line advance" command, for moving the displayed data up by one line, while two consecutive actuations of sensor element 18 can serve as a "rollback" command, for causing the displayed data to be moved downward by one line. Two consecutive inputs of connecting line 53 can serve as an "erase" command, whereby a pattern which has just been entered in error can be erased by the user. Consecutive inputs of connecting lines 42, 53 and once more 43 can serve as a "line space" command, whereby a one-line space is opened in the lines of displayed characters, so that the user can insert an additional line between them. Consecutive inputs of connecting lines 46, 50 and 46 can serve as a "line delete" command, for deleting a line of the display, by moving part of the display upward by one line. Simultaneous actuations of sensor element 15 and 13 can serve as a "line exchange" command, causing the top and bottom lines of the display to be interchanged, as indicated in FIG. 25(H). And simultaneous actuations of sensor elements 11, 12, 14 and 15 can serve as a "command input mode" command, which causes the controlled circuit to enter a condition in which subsequent input patterns from the data input device will be interpreted as commands. Thus for example after inputting this "command input mode" command, it could be arranged that input of the character group "DIS3" would cause line 3 of the stored data to be called out and displayed. In this way it becomes possible to input an almost unlimited number of different commands, using only the nine sensor elements of a data input device according to the present invention such as is illustrated in FIG. 1 and FIG. 2. It should be noted that the only requirement for a command input using the sensor elements is that it should not involve operations which will be performed when inputting a letter, numeral or symbol. Since simultaneous actuations of two or more sensor elements, or consecutive actuations of a sensor element, or consecutive inputs of the same connecting line, will never occur during input of a pattern, these can be used for command input purposes. The same is also true of certain consecutive inputs of three or more connecting lines, such as in the cases of FIGS. 25(F) and (G).

It should be noted that the arrangement for command inputs suggested in FIG. 25 can provide additional convenience in that the basic commands can be easily remembered by the positions of the sensor elements which are actuated. Thus for example in FIGS. 25(A) and (B) right-hand and left-hand sensor elements are used to input right-shift and left-shift commands. Similarly in FIGS. 25(C) and (D), upper and lower sensor elements are actuated to provide movement of the displayed data upward and downward respectively.

Circuit means for detecting two consecutive actuations of a particular sensor element have been described above, and it will be apparent that such a circuit can be utilized to provide command input signals for the cases of FIGS. 25(A), (B), (C) and (D).

Figure 26:
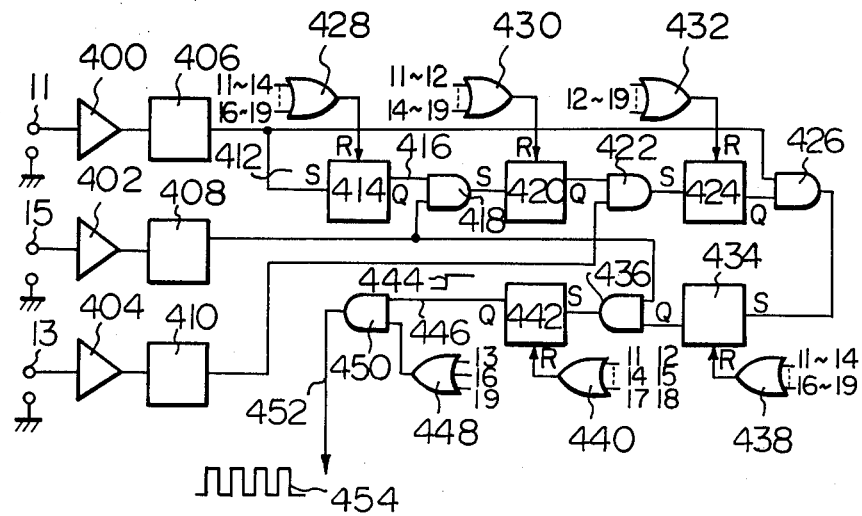
FIG. 26 is a diagram of a circuit for generating command signals to control a display device coupled to a data input device according to the present invention based on the method described in FIG. 25.

FIG. 26 shows a signal which can generate command signals in response to a plurality of consecutive connecting line inputs, such as in the case of the example of FIG. 25(F). In that example, the order of actuation of the sensor elements, to provide the indicated connecting line inputs, will be 11, 15, 13, 11 and 15. In FIG. 26, sensor elements 11, 15 and 13 are coupled to inputs of amplifier circuits 400, 402 and 404 respectively, whose outputs are applied to waveform shaping circuits 406, 408 and 410. Examples of such amplifier and waveform shaping circuits have been described hereinabove, and will not be described further, with each of waveform shaping circuits 406 to 404 being assumed to consist of a one-shot multivibrator. Inputs to a plurality of OR gates 428, 430 etc, are designated by sensor element numerals, but it should be understood that in each case such an input represents the output of a waveform shaping one-shot multivibrator for the sensor element thus designated.

The output from one-shot multivibrator 406 is applied to the "set" of a reset-set type flip-flop (abbreviated hereinafter to RS FF)414, whose "reset" input is coupled to the output of an OR gate 428. OR gate 428 receives input signals from sensor elements 11 to 14 and 16 to 19. The output from RS FF 414 is applied to one input of a two-input AND gate 418, so that this input goes to the H level when sensor element 11 is actuated. The other input of AND gate 418 is coupled to the output from one-shot multivibrator 408, so that AND gate 418 is enabled if sensor element 15 is actuated after sensor element 11. The output from AND gate 418 thereby goes to the H level, and serves to set an RS FF 420 to produce an H level output, which is applied to one input of an AND gate 422. It should be noted that since the "reset" input of RS FF 414 is coupled to the output of OR gate 428, RS FF 414 will be reset, before AND gate 418 can be enabled, if a sensor element other than element 15 is actuated after sensor element 11. Thus, in order to set RS FF 420 it is necessary to actuate sensor elements 11 and 15 consecutively. Similarly, the output from RS FF 420 will set the next stage RS FF 424 only if sensor element 13 is actuated after consecutive actuations of sensor elements 11 and 15. Actuation of any sensor element other than 13 at this time will result in RS FF 420 being reset by the output of OR gate 430, so that AND gate 422 will not be enabled and RS FF will not be set. RS FFs 434 and 442 are set based on similar limitations, so that an output signal 444 at the H level from RS FF 442 will only be produced if the sensor elements are actuated in the sequence 11, 15, 13, 11, and 15 consecutively. This represents the sequence of connecting line inputs shown in FIG. 25(F). The output signal 444 from RS FF 442 can therefore represent the "line advance" command referred to above. AND gate 450 can now be considered to be in a "wait" state, to receive commands designating the number of lines which have to be advanced, as represented by the outputs from OR gate 448, i.e. outputs produced by the one-shot multivibrators of sensor elements 13, 16 and 19. In this condition, if the user's finger is traced sequentially from top to bottom over the line of sensor elements 13, 16 and 19, a pulse train 454 will be generated from AND gate 450. The number of pulses thus generated can be utilized as a command designating the number of lines by which display advance is to be performed. In other words, if if n pulses are thus generated by the user repetitively passing his finger over the line of sensor elements 13, 16 and 19, then the displayed data will be advanced by n lines.

It will be apparent that circuit means for utilizing the command signals generated as discribed above to perform the operations described are easily available at present, in the form of microprocessor chips, RAM integrated circuits, etc., and therefore such circuit means will not be described herein.

The circuit of FIG. 26 can be returned from the "line advance" command status, with output signal 444 being produced at the H level from RS FF 442, to the normal pattern input mode of operation by actuating any of sensor elements 11, 12, 14, 15, 16, 17 or 18. This will result in an H level output being produced from each of OR gates 428, 430, 432, 438, 440 and 448, to thereby reset all of RS FFs 414, 420, 424, 434 and 442. Input of data in the form of patterns using sensor elements 11 to 19 can then be immediately commenced.

Figure 27:
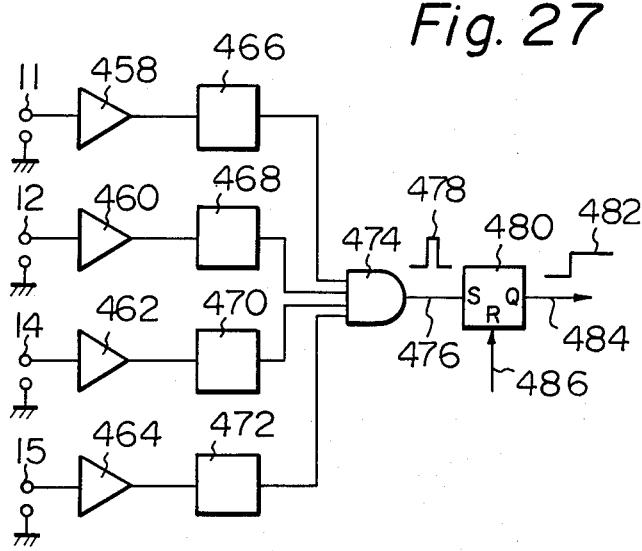
FIG. 27 shows another embodiment of a command signal generating circuit which is responsive to simultaneous actuation of a predetermined set of adjacent sensor elements of a data input device according to the present invention.

FIG. 27 shows a circuit whereby a command signal can be generated by simultaneous actuations of of sensor elements 11, 12, 14 and 15. Each of these sensor elements is coupled to a corresponding one of a set of input amplifier circuits 458 to 464, the outputs from which are applied to waveform shaping circuits 466 to 472 comprising for example one-shot multivibrators as described hereinabove. It will be apparent that simultaneous actuations of sensor elements 11, 12, 14 and 15 will result in simultaneous output signals being produced from one-shot multivibrator circuits 466, 468, 470 and 472, resulting in an output pulse 478 being produced by AND gate 474. Output pulse 478 acts to set an RS FF, which thereby produces an H level output signal 482 on line 484. This output signal 482 can be used as a command signal designating that the circuitry coupled to the data input device be set in the "command input mode" described above with reference to FIG. 25(I). When input of a command has been performed, for example the command "DIS 3", as described above, then the normal pattern input mode of operation will be restored, by the user actuating sensor elements 11 to 19 in some predetermine manner to generate a reset input which is applied over line 486 to the "reset" input of RS FF 480. Alternatively, the circuitry controlled by command signal 482 can be arranged to issue a completion signal upon completion of the operation specified by the command, and this completion signal can be used to reset RS FF 480 and to restore the normal pattern input mode of operation.

In the above, embodiments of the present invention have been described in which an array of nine sensor elements comprising touch-sensitive sensor electrodes are arranged on an electrode plate which is transparent (e.g. a watch glass of an electronic timepiece) over a display (e.g. a liquid crystal display of a timepiece). However it should be noted that a data input device according to the present invention is applicable to various other data input requirements, and need not necessarily be associated with a display device. In addition, various other types of sensor element other than touch-sensitive electrodes are utilizable with a data input device according to the present invention. The only essential requirement for such a sensor element is that it should be capable of generating an electrical signal in response to manual actuation.

The circuit means whereby, for example, sequential comparison between the contents of input memory circuit 150 and of pattern memory circuit 154 are performed by comparator circuit 152, have not been detailed herein. This is because circuit devices of various types are widely available at present for performing such functions, including programmable microprocessor integrated circuit chips, etc., so that the implementation of such functions as pattern comparison processing using such circuit devices will be obvious to one skilled in the art.

From the preceding description, it will be apparent that the objectives set forth for the present invention are effectively attained. Since various changes and modifications to the above construction may be made without departing from the spirit and scope of the present invention, it is intended that all matter contained in the above description shall be interpreted in an illustrative and not in a limiting sense. The appended claims are intended to cover all of the generic and specific features of the invention described herein.

What is claimed is:

1. A data input device for inputting data in the form of patterns to an electronic device, comprising:
   an array of sensor elements arranged in predetermined fixed positions, each of said sensor elements being individually actuatable for generating an electrical signal, said inputting of data being performed for each of said patterns by manually tracing out a combination of connecting lines between pairs of said sensor elements, said combination of connecting lines representing the shape of said input pattern, with a plurality of said sensor elements being successively actuated in the course of tracing out said combination of connecting lines;
   connecting line discrimination circuit means responsive to said electrical signals from said sensor elements for generating output signals corresponding to pairs of said sensor elements for which successive actuations occur during tracing out of said input pattern, said output signals thereby corresponding to said connecting lines of said input pattern;
   input memory means responsive to said output signals from said connecting line recognition circuit means, for storing data corresponding to said combination of connecting lines representing said input pattern;
   pattern memory circuit means having data stored therein representing a plurality of said patterns in the form of a plurality of combinations of said connecting lines; and
   comparator circuit means for comparing the contents of said input memory means with the contents of said pattern memory means upon completion of inputting said input pattern, for thereby detecting coincidence between said input pattern and one of said patterns stored in said pattern memory circuit means, and responsive to said detection for generating data identifying said input pattern, said pattern identifying data being transferred to said electronic device;
   in which each of said combinations of connecting lines representing a pattern stored in said pattern memory means comprises a partial set of connecting lines selected out of the total number of connecting lines by which said stored pattern is represented when stored in said first memory means through actuation of said sensor elements, said partial set of connecting lines being the minimum combination of connecting lines which will uniquely define said store pattern in relation to all other input patterns stored in said pattern memory means, when comparison between the contents of said input memory means and pattern memory means is performed;
   in which said comparator circuit means is operative to sequentially compare said input pattern represented by the contents of said input memory means with each of said plurality of patterns represented by the contents of said pattern memory means, for thereby recognizing said input pattern; and
   in which said comparator circuit means performs said sequential comparison beginning with a pattern stored in said pattern memory means comprising a set of said connecting lines which overlaps a maximum number of other ones of said patterns stored in said pattern memory means.

2. A data input device as claimed in claim 1, in which a plurality of said sensor elements are normally held in a non-operative condition in which no electrical current is drawn therethrough, while at least one of said sensor elements is held in a normally operative condition, and further comprising control circuit means coupled to said sensor elements and responsive to actuation of said normally operative sensor element in a predetermined manner for setting said normally non-operative sensor elements in the operative condition, and further comprising delay circuit means operative to reset said normally sensor elements to the non-operative condition following a predetermined time interval after initiation of the operative condition thereof.

3. A data input device as claimed in claim 1, and further comprising command signal generating circuit means responsive to actuations of said sensor elements in a predetermined manner for generating command signals to control the operation of said electronic device, said predetermined actuations of said sensor elements being different from any actuations of said sensor elements performed during input of said patterns representing data, in which said command signal generating circuit means is responsive to a plurality of successive actuations of a predetermined one of said sensor elements for generating said command signals.

4. A data input device as claimed in claim 1, in which said patterns stored in said pattern memory means comprise a first group of patterns representing each of the letters of the alphabet and a second group of patterns representing the numerals from 0 through 9, and in which said first group of patterns comprise combinations of connecting lines between up to a maximum of all nine of said sensor elements, while said second group of patterns are limited to combinations of said connecting lines between a predetermined sub-set of said plurality of sensor elements, in which said sub-set of sensor elements comprises a central set of three sensor elements and a set of three sensor elements arranged along a side of said regular rectangular array parallel to said central set of three sensor elements.

5. A data input device as claimed in claim 1, in which said array of sensor elements comprise a plurality of touch-sensitive sensor electrodes arranged on a watch glass of an electronic timepiece, in which said electronic device comprises a display device of said electronic timepiece.

* * * * *